GRAY SCALE AND TRACKING ALIGNMENT INSTRUMENT FOR
A COLOR CATHODE RAY TUBE

Filed March 21, 1966

INVENTOR
Charles E. Mussulman
BY
Hovey, Schmidt, Johnson & Hovey
ATTORNEYS

United States Patent Office 3,401,331

Patented Sept. 10, 1968

3,401,331

GRAY SCALE AND TRACKING ALIGNMENT INSTRUMENT FOR A COLOR CATHODE RAY TUBE

Charles E. Mussulman, 1309 W. 5th, Chanute, Kans. 66720

Filed Mar. 21, 1966, Ser. No. 535,923
8 Claims. (Cl. 324—20)

ABSTRACT OF THE DISCLOSURE

An instrument is provided for aligning color television sets for monochrome operation. The instrument indicates when the gray scale or monochrome image is obtained and enables the set to be adjusted for proper tracking of the electron guns during monochrome operation. A test head is positioned on the screen of the television tube and contains three photosensitive resistance elements responsive to the emissions of the red, green and blue phosphors respectively. Three measuring circuits are employed and each includes a zero-centered microammeter responsive to a corresponding photosensitive element. The circuits are interconnected in a manner such that an increase in the intensity of one color is indicated by the respective meter and, simultaneously, is also registered in the two other meters by an inverse indication.

This invention relates to apparatus for use in aligning color television sets and, more specifically, to an alignment instrument which enables a technician to adjust the picture tube driver circuits for proper gray scale and tracking during monochrome operation.

A conventional and widely used type of color television receiver employs a picture tube screen wherein the image is formed by an orderly array of phosphor dots arranged in triangular fashion, such that each triangle consists of a red-emitting a green-emitting, and a blue-emitting dot. Three electron guns excite respective color dots as the screen is scanned, thereby producting the color image. For monochrome reception the guns are adjusted such that the dots are excited by electron beams of equal intensities, regardless of the degree of saturation.

The controls commonly provided for alignment of the set include three screen controls for the grids of the respective guns, and two background controls which are associated with the two guns which provide the green and blue components of the image. The three screen controls govern gun response, while the background controls on the "green" and "blue" guns serve to compensate for the nonlinearity of the guns between conditions of low and high emission. If the screen controls are improperly set, misalignment is apparent to the viewer since a color tint or color outline of a monochrome image may be observed. If emission nonlinearity exists, the guns will not track properly as the brightness control is varied and, again a deviation from true gray scale reproduction will be observed.

Heretofore, it has been the practice to align color television sets for monochrome operation by simply observing the image on the screen and adjusting the screen and background controls in accordance with the observed image. Manifestly, this is a time-consuming technique since it essentially involves experimentation on the part of the technician and reliance on the sensitivity of the eye.

It is, therefore, the primary object of this invention to provide an instrument which will indicate when the gray scale or monochrome image is obtained without relying on observation of the image and experimentation during the alignment of a color television set for monochrome operation.

As a corollary to the foregoing object, it is an important aim of this invention to provide an instrument which will enable the set to be adjusted for proper tracking of the electron guns during monochrome operation.

A specific object of the instant invention is to provide an instrument as aforesaid wherein each color component is sensed by a photosensitive element after the light radiation from the screen passes through a filter having a color corresponding to the color component to be sensed by the element, and wherein such elements are employed in measuring circuits having electrosensitive meters which indicate the direction of change of the intensities of the components as the controls of the set are varied during alignment.

A further object is to provide means operable in conjunction with the aforesaid measuring circuits in a manner such that each meter is inversely responsive to a variation in the color component detected by the photosensitive element associated with another meter, and wherein each meter is rendered operable to provide a predetermined indication regardless of the intensity of the corresponding component when the intensities of all of the components bear a predetermined relationship to one another.

Figure 1:
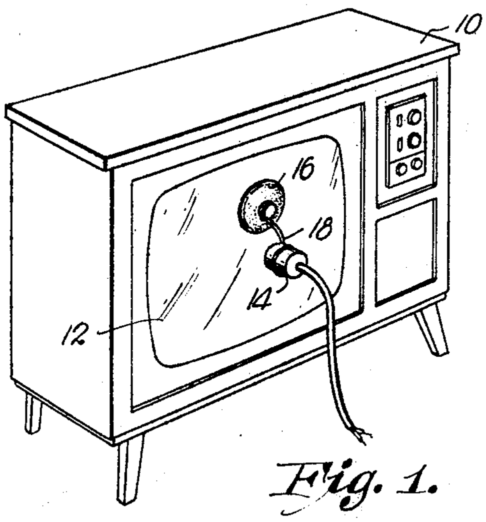
FIGURE 1 is a perspective view of a color television set showing the test head of the instant invention in place thereon.
Figure 2:
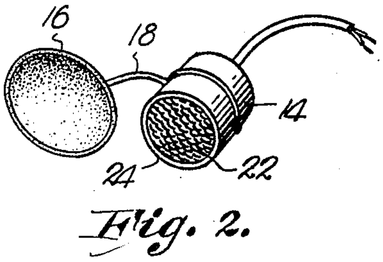
FIG. 2 is a perspective view of the tests head.

The numeral 10 designates the cabinet of a color television set provided with a picture tube having a screen 12. A test head 14 is held against the screen by a suction cup 16 connected to the head by a wire bracket 18.

Head 14 is in the form of a housing of circular cross section having an open, circular end 20 (FIG. 4) which permits the passage of light into the head through a circular diffusion lens 22. Head 14 is preferably rubber covered or formed in a manner to resist shock if accidentally dropped. Lens 22 is disposed within opening 20 a sufficient distance to present a lip 24 which engages the outer surface of screen 12 when head 14 is in its operative position.

Conventional 110 volt alternating current is applied at terminals 26 and energizes the primary 28 of a transformer having three secondary windings **30*a*, 30*b* and 30*c*. Rectifier-filter circuits 32*a*, 32*b* and 32*c* are connected to respective secondary windings 30*a*–30*c* to provide a direct potential output across resistors 34*a*, 34*b* and 34*c***.

Three identical measuring circuits **36*a*, 36*b* and 36*c* are employed and are associated with transformer secondaries 30*a*, 30*b* and 30*c*, respectively, as shown. Circuit 36*a* includes a photocell 38*a* having a light-dependent internal resistance, and a 100–0–100 DC microammeter 40*a* having a pair of test connections 42*a* and 44*a*. The pointer or indicator 46*a* of microammeter 40*a*** is centered as shown when there is no current flow through the meter.

The components of the other two measuring circuits **36*b* and 36*c* are designated by the same reference numerals as used above in the description of circuit 36*a***, except for the use of the "*b*" and "*c*" notations. The three circuits are coupled together by a lead 48 interconnecting connections **42*a* and 44*c*, a lead 50 interconnecting connection 44*a* and connection 42*b*, and a lead 52 interconnecting connection 44***b* and connection 42*c*.

The photocells 38*a*–38*c* may be of the cadmium selenide, lead sulfide, or cadmium sulfide type, and have a high resistance in the absence of light radiation impinging thereon. The transformer secondaries 30*a*–30*c* and rectifier-filters 32*a*–32*c* are selected to deliver equal potentials across resistors 34*a*, 34*b* and 34*c*. A potential of 25 volts across each resistor is preferred when a 100–0–100 microammeter movement is utilized for the meters 40*a*–40*c*. The voltages and the meter range suggested above are selected in accordance with the resistance characteristics of the photocells and may be changed as required to accommodate the properties of the particular cell utilized.

Figure 4:
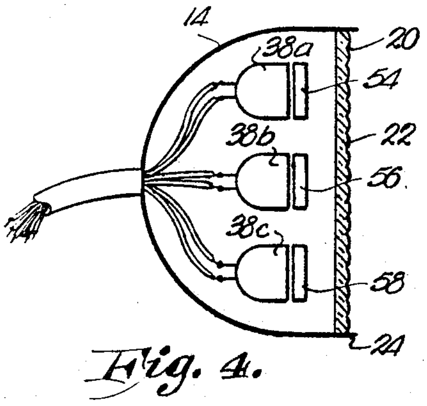
FIG. 4 is a diagrammatic, sectional view of the test head.
Figure 5:
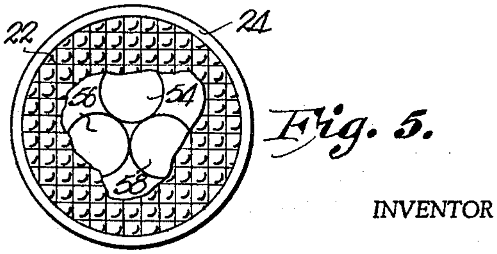
FIG. 5 is a front view of the test head, a portion of the diffusion lens being broken away to reveal the light filters.

Referring to FIGS. 4 and 5, three optical filters 54, 56 and 58 are shown associated with photocells 38*a*, 38*b*, and 38*c*, respectively. As illustrated diagrammatically in FIG. 4, the filters are disposed in a manner to prevent each photocell from being exposed to radiation other than the radiation that passes through its associated filter. Filters 54, 56 and 58 are red, green and blue in color respectively; therefore, measuring circuits 36*a*, 36*b* and 36*c* respond only to the red, green and blue components of the image, respectively, when head 14 is in position on screen 12. The exact hues of light pass frequencies of the filters are selected in accordance with the wave lengths of the radiation emitted by the phosphors utilized in the picture tube.

In operation, head 14 is attached to the set by suction cup 16 as illustrated. It will be appreciated that the photocells therewithin are thus subjected only to the light radiation from screen 12, since lip 24 precludes substantial amounts of ambient light from entering the head. Initially, pointers 46*a*–46*c* will be at the center zero reading since the voltages across resistors 34*a*–34*c* are equal and all of the photocells 38*a*–38*c* are in the high impedance state. In the discussion to follow, it will be appreciated that photocells of like characteristics are employed in order that each photocell will assume the same internal resistance in response to light rays of a given intensity. This is significant since, in conventional color television apparatus, the gray scale or monochrome image is produced by equal intensities of the radiation from the three phosphor dots of each dot trio.

The alignment procedure is initiated by advancing the brightness control of the television set to maximum, and adjusting the contrast control to its minimum setting. The three screen and two background controls discussed hereinabove are all placed at their minimum settings. At this time, there will be no emission from the tube guns; therefore, the meter pointers 46*a*–46*c* will all read zero.

Figure 3:
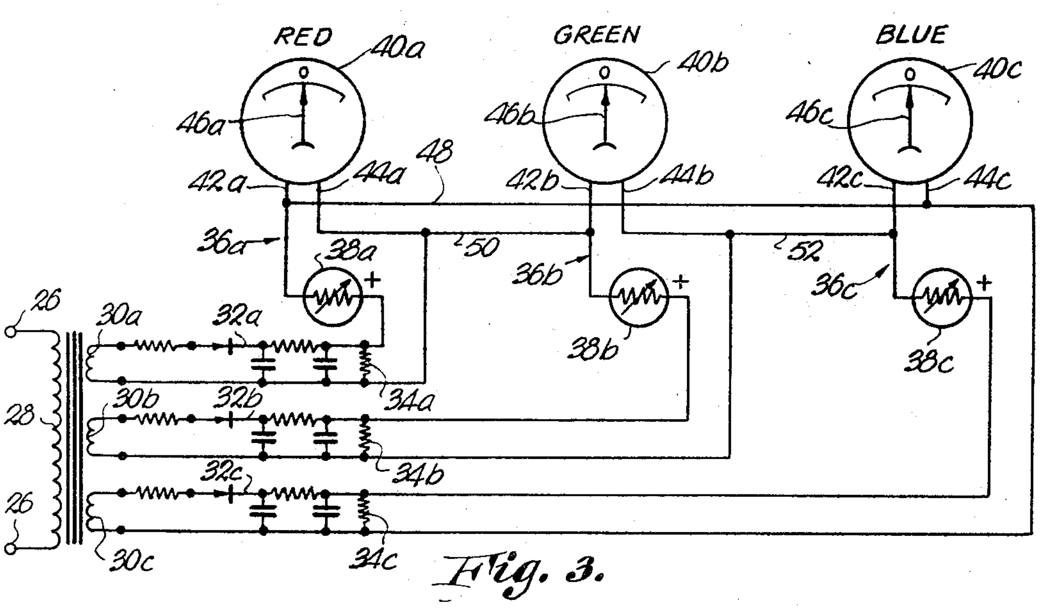
FIG. 3 is an electrical schematic diagram of the instrument.

The second step of the alignment procedure is to adjust the screen control of the red color gun until pointer 46*a* of red meter 40*a* reads 50 microamperes in the positive direction (the pointer would move to the right as viewed in FIG. 3). This causes the photocell 38*a* to decrease substantially in resistance in response to the radiation from the red-emitting phosphors. Simultaneously, the pointers of the green and blue meters 40*b* and 40*c* will swing in a negative direction (to the left) because of the unbalancing effect produced by the change in the resistance of photocell 38*a*. It is noteworthy, therefore, that the three measuring circuits 36*a*, 36*b* and 36*c* do not act entirely independently. Leads 48, 50 and 52 interconnect the measuring circuits in a manner such that each meter is inversely responsive to a variation in the internal resistance of a photocell associated with another of the meters. Thus, when the red screen control is adjusted to give a positive 50 reading at meter 40*a*, the pointers 40*b* and 40*c* will each indicate minus 25.

Next, the technician reduces the brightness control until red meter 40*a* reads plus 10. The green and blue screen controls are then adjusted until meters 40*b* and 40*c* again read zero. This automatically returns pointer 46*a* of red meter 40*a* to the zero reading due to the inverse response effect discussed above.

The brightness control is reduced only until red meter 40*a* reads 10 in order to assure that the photocells of the instrument will sense enough light to enable the instrument to respond to the subsequent procedure. Manifestly, this simultaneously causes the pointers of 40*b* and 40*c* to move to minus 5.

After the screen controls for the green and blue guns are adjusted to produce zero readings at all three meters, the brightness control is returned to its maximum setting. The background controls (provided for the green and blue color guns) are then adjusted to again obtain zero readings at all meters. This step is utilized because the background controls have little effect at low brightness settings; therefore, the background is adjusted at maximum brightness.

Finally, the brightness control is reset at approximately the one-fourth brightness position and the meters are rechecked to assure that the pointers are all indicating zero. It is likely that the green and blue screen controls will have to be adjusted somewhat in order to compensate for the effect that the previous step had upon the validity of the screen control settings. A one-quarter brightness position is utilized to assure that enough light is available for instrument operation since, as alignment is now complete, it cannot be ascertained from the meters whether or not sufficient light is available. It will be appreciated that unless the screen controls require readjusting after the brightness control is returned to one-quarter position, the meters will all read zero because of the balanced state of the circuit resulting from the equal internal resistances of the photocells.

After alignment it will be observed that the brightness control can be varied between its extreme positions without causing a substantial deviation in the meter readings from zero. This indicates that linear tracking has been obtained and that a monochrome image of proper gray scale frequency is being produced by the picture tube. It should be noted that, during the foregoing procedure, the red screen control was not readjusted after being set to cause a red meter reading of plus 50 in the second step of the procedure. Subsequent steps of the procedure then effectively aligned the green and blue color guns with the initial red screen control setting, through the use of their screen controls and the background controls provided for nonlinearity compensation.

It is apparent that the procedure outlined hereinabove may be varied in accordance with the particular operating characteristics of a set to be aligned. The procedure is, however, instructive as a guide in the utilization of the instant invention.

Having thus described the invention, what is claimed as new and desired to be secured by Letters Patent is:

1. For use in the alignment of a color television set provided with a picture tube screen capable of emitting light having a plurality of components of different colors, an instrument comprising:

a plurality of circuits for measuring the intensity of respective components, each of said circuits including a photosensitive element adapted for disposition in light-receiving relationship to said screen and having an electrical characteristic which varies in magnitude in response to changes in the intensity of the corresponding component impinging thereon, and an indicating device operable to indicate an increase or a decrease in the magnitude of the characteristic of the associated element; and means intercoupling said circuits and rendering each of said devices inversely responsive to a variation in the characteristic of the element associated with another device whereby, when one of said components increases or decreases in intensity while the intensity of another component remains constant, the device corresponding to the component of changed intensity indicates the direction of change therein while the device corresponding to the constant intensity component indicates a response in the opposite direction.

2. The invention of claim 1; and a plurality of light filters, each permitting passage of a different one of said components therethrough, said filters being associated with respective elements and disposed to prevent exposure of each element to light radiation other than the component passed by its associated filter.

3. The invention of claim 2, each of said elements comprising a photocell having a light-dependent internal resistance.

4. The invention of claim 2; and a test head housing said elements and said filters, and having a light-receiving opening therein, said head being provided with means for mounting the head on said set with said opening facing the screen.

5. The invention of claim 4, said head having a diffusion lens extending across said opening.

6. The invention of claim 1, said means rendering each device operable to provide a predetermined indication for all intensities of the corresponding component when the intensities of said components bear a preselected relationship to one another.

7. The invention of claim 1, each of said devices comprising an electrosensitive meter having a current-responsive indicator, each of said elements comprising a photocell having said characteristic in the form of a light-dependent internal resistance, each of said circuits having means coupled with the photocell thereof for applying an electrical potential thereto.

8. The invention of claim 1, each of said devices comprising an electrosensitive meter having a pair of electrical connection points, a current-responsive indicator, and means coupling said indicator between said points for operation in response to unidirectional current flow therebetween in either direction, each of said elements comprising a photocell having said characteristic in the form of a light-dependent internal resistance, each of said circuits having means coupled with the photocell thereof for applying a direct electrical potential thereto, said circuit intercoupling means establishing equal potentials at each of said pairs of points when the resistances of said photocells are equal, whereby the photocells may be selected to cause a no current flow indication at said meters regardless of the intensities of said components, when said intensities bear a predetermined relationship to one another.

References Cited

UNITED STATES PATENTS

| | | | |
|---|---|---|---|
| 2,510,347 | 6/1950 | Perkins | 250—226 XR |
| 2,799,825 | 7/1957 | Hardy | 324—20 |
| 3,309,459 | 3/1967 | Donigian | 250—226 XR |

RUDOLPH V. ROLINEC, *Primary Examiner.*

E. L. STOLARUN, *Assistant Examiner.*